METHOD OF AND APPARATUS TO MONITOR INTERCONNECTED SPEECH CIRCUITS FOR NOISE

Filed Dec. 22, 1961 6 Sheets-Sheet 1

INVENTOR
W. G. FEGER
BY Patrick J. Roche
ATTORNEY

INVENTOR
W. G. FEGER
BY Patrick J. Roche
ATTORNEY

INVENTOR
W. G. FEGER
BY
Patrick J. Roche
ATTORNEY

Dec. 14, 1965 W. G. FEGER 3,223,780

METHOD OF AND APPARATUS TO MONITOR INTERCONNECTED SPEECH CIRCUITS FOR NOISE

Filed Dec. 22, 1961 6 Sheets-Sheet 4

INVENTOR
W. G. FEGER
BY Patrick J. Roche
ATTORNEY

INVENTOR
W. G. FEGER
BY Patrick J. Roche
ATTORNEY

INVENTOR
W. G. FEGER
BY Patrick J. Roche
ATTORNEY

United States Patent Office 3,223,780
Patented Dec. 14, 1965

3,223,780

METHOD OF AND APPARATUS TO MONITOR INTERCONNECTED SPEECH CIRCUITS FOR NOISE

Werner G. Feger, Morristown, N.J., assignor to Bell Telephone Laboratories, Incorporated, New York, N.Y., a corporation of New York Filed Dec. 22, 1961, Ser. No. 161,647
19 Claims. (Cl. 179—1)

This invention relates to a method of an apparatus for detecting noise energy in the presence of speech energy in a telephone system, and more specifically to such method of and apparatus for detecting noise while speech is present in a telephone system comprising a bridge network interconnecting a plurality of telephone subscribers for speech transmission thereamong.

In the prior use of bridge networks arranged for conference setups among a plurality of remotely located subscribers, it has been found that noise originating on any one of the subscribers' lines also appears on the lines of the remaining subscribers thereby tending to impair the intelligibility of the speech transmission on all subscribers' lines. Such noise may result in serious harm in the transmission of telephone messages from a central subscriber to a plurality of geographically spaced subscribers on such occasion in which time is of the extreme essence. This may occur when an emergency condition allows for the transmission of the message from one subscriber to the remaining subscribers once or twice, but no more than that, in a given time interval. If the message failed to reach its ultimate destination or destinations with sufficient clarity to enable the institution of a proper prearranged action thereat or to reach its ultimate destination in such garbled form as to cause the institution of an improper action thereat, then great harm could conceivably result therefrom.

In the prior use of the conference bridge network, there was no way of knowing in advance what the actual noise condition was on the respective circuits connected in the network, short of manually ascertaining the noise condition at predetermined time intervals and thereafter clearing or changing the circuit if necessary. This would involve intolerable economic factors of manpower and money costs, as well as the further factor of human error if meter readings were to be read and recorded.

The present invention contemplates an arrangement for automatically detecting and indicating an intolerable noise level in the presence of speech on each of the respective transmission paths connected in a conference bridge network as a continuous procedure. This enables an immediate substitution of a tolerably low-level noise circuit, or alternate route, for the noisy route, while the latter is being cleared of the noise fault. It also enables the conference network to be maintained at a high level of intelligibility at all times.

It is a principal object of the present invention to monitor simultaneously and continuously a plurality of interconnected speech circuits for an intolerable noise level.

It is another object to detect noise energy in the presence of speech energy on each of a plurality of interconnected speech transmission circuits.

It is a further object to indicate the occurrence of an intolerable noise level in the presence of speech energy in each of a plurality of interconnected speech transmission circuits.

It is still another object to differentiate between noise energy and speech energy in a single including both noise and speech energy on each of a plurality of interconnected speech circuits.

It is still another object to monitor each of a plurality of interconnected speech circuits for the presence of both speech and noise voltage.

It is a still further object to indicate an intolerable noise level regardless of the presence or absence of speech in a signal including both noise and speech components on each of a plurality of speech transmission circuits.

It is a still further object to suppress the effect of a speech component when monitoring a noise component in the presence of a speech component on each of a plurality of interconnected speech transmission circuits.

It is still another object to monitor simultaneously each of a plurality of interconnected speech transmission circuits for intolerable noise levels so that alternate circuits may be substituted therefor upon indications of such noise levels.

It is still another object to monitor discrete speech circuits connected for intercommunication in a speech transmission system for continuously maintaining the respective circuits of such system with tolerable noise levels.

In association with a resistance bridge network interconecting a plurality of incoming speech transmission circuits, the present invention in a specific embodiment comprises apparatus to monitor continuously the speech signals on each of such circuits for a noise component in the presence of a speech component. In accordance with this embodiment, a predetermined level of the noise and speech signal serves to activate a first trigger circuit for providing a plurality of groups of square waves having certain time intervals formed between such groups and representing syllables and/or words in the speech component and a succession of closely spaced square waves representing the noise component. The noise square waves do not include the syllabic time intervals inherent in the speech component.

A first integrator circuit integrates the speech square waves as a function of their periodicity over a preselected time interval, as well as the noise component. The integrated speech and noise square waves are then fed into a second trigger circuit provided with a predetermined threshold voltage, and produce in the output thereof square-wave pulses representing the speech component and a substantially constant voltage of predetermined magnitude representing the noise component. As the integrated speech and noise components overcome the threshold voltage of the second trigger circuit a lamp connected in the output thereof is caused to flash by the last-mentioned square-wave pulses for indicating the speech component and to illuminate steadily in response to the predetermined constant magnitude voltage for indicating the noise component. Thus, the noise is indicated in the presence of speech on each of the incoming speech circuits.

In a second embodiment of the invention involving a modification of the first embodiment and arranged to suppress the last-mentioned speech square-wave pulses thereby eliminating the speech indication but to transmit the predetermined constant voltage for indicating only the noise component in the presence of the speech component, the lamp is removed from the second trigger circuit output so that both the integrated speech and noise components are applied simultaneously to a differentiator circuit and a second integrator circuit including a capacitor. The noise component in the second trigger circuit output is transmitted via the second integrator circuit to a third is transmitted via the second integrator circuit to a third trigger circuit provided with a predetermined threshold voltage and including a lamp in the output thereof. Now, the constant noise voltage provides on the capacitor included in the second integrator circuit a voltage charge to overcome the threshold voltage of the third trigger circuit for causing the lamp in the output thereof to illuminate steadily thereby indicating the occurrence of the noise component. The constant noise voltage in the second trigger circuit output has no appreciable effect on the operation of the differentiator circuit.

The speech square waves in the second trigger circuit output applied simultaneously to the differentiator and second integrator circuits serve to charge the capacitor of the second integrator circuit and at the same time to produce a series of positive and negative spikes in the output of the differentiator. The positive spikes only activate ON-OFF transistor switching circuit to maintain the magnitude of the voltage charge on the second integrating capacitor below the threshold voltage of the third trigger circuit for suppressing the effect of the last-mentioned speech square waves in the following manner: Normally, the switching circuit resting in the OFF condition in the absence of speech voltage is effectively disconnected from the second integrator capacitor. As the speech square waves charge the second integrator capacitor, each positive spike activates the switching circuit to the ON condition which thereupon short-circuits the last-mentioned capacitor directly to ground. This serves to discharge the capacitor for the duration of the spike. Upon the termination of the spike, the switching circuit returns to the OFF condition whereupon the short-circuit across the second integrator capacitor is removed. This operation of the ON-OFF circuit is repeated for the occurrence of each positive spike whereby the voltage charge on the second integrator capacitor is continuously maintained below the threshold voltage of the third trigger circuit. As a consequence, the lamp in the third trigger circuit is never illuminated in response to the speech component of the input speech signal to the bridge network. As the noise voltage has no appreciable effect on the differentiator circuit, the switching circuit is allowed to remain in the OFF condition during the occurrence of noise. Thus, the noise voltage only is detected and indicated in the presence of speech on each of the incoming speech circuits. As such indication may occur before or during a conference involving the use of the bridge network, the noisy circuit may be replaced with an alternate circuit, without appreciably impairing the intelligibility of the voice transmission during the conference.

The invention will be readily understood from the following description when taken together with the accompanying drawing in which.

Figure 3:
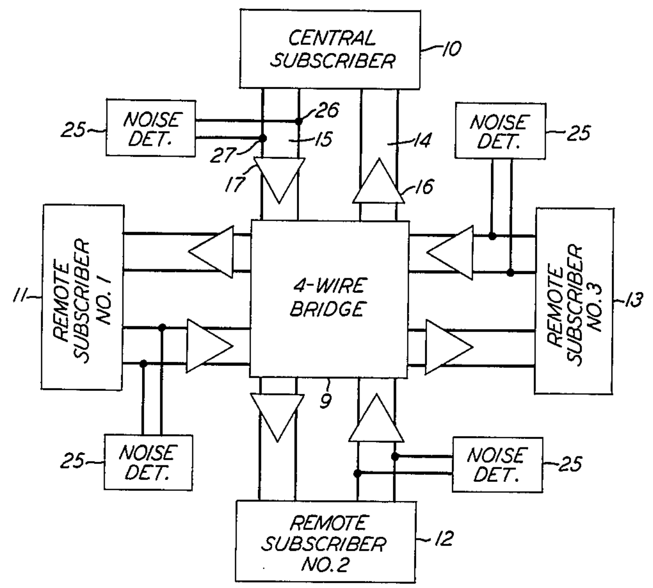
FIG. 3 is a box diagram of a conventional telephone conference bridge arranged to provide speech communication among four subscribers.

FIG. 3 illustrates a telephone conference bridge 9 arranged to accommodate four talkers, and includes a central subscriber 10 which is connectable to talk to each one or all of remote subscribers 11, 12, and 13 in the well-known manner at a given time. Each remote subscriber is connected to talk to the central subscriber, as well as to each or all of the other remote subscribers at a given time. The connection of each subscriber to the bridge comprises two one-way lines 14 and 15, each including a one-way amplifier 16 or 17 for enabling speech transmission in opposite directions among the several subscribers.

Figure 4:
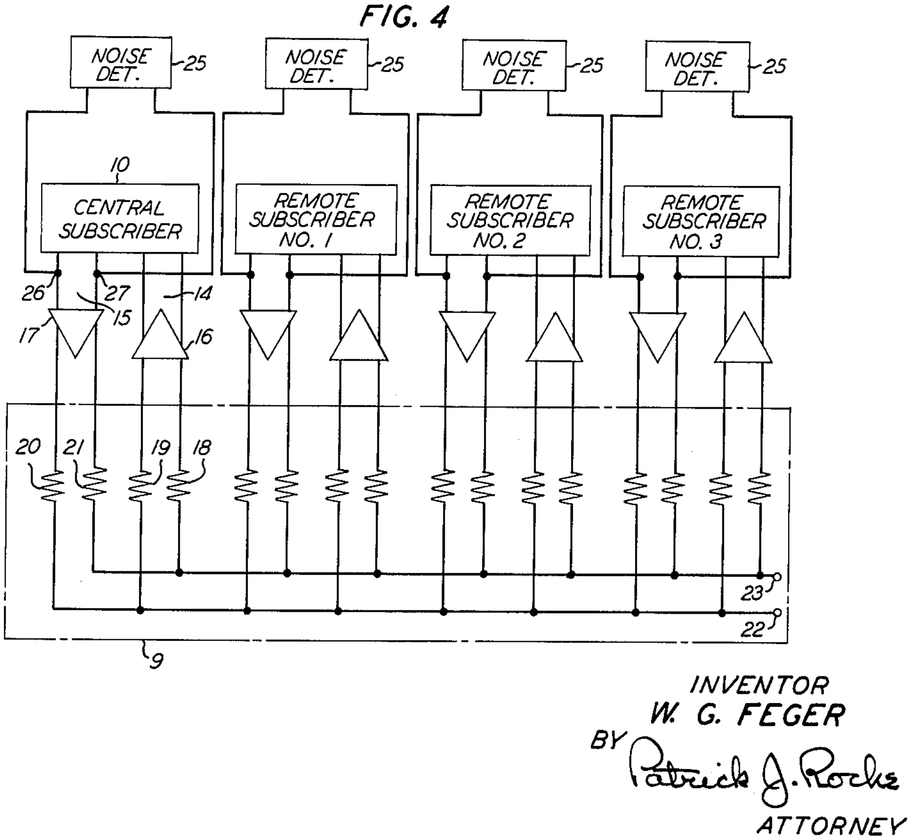
FIG. 4 is a modification of the block diagram of FIG. 3 showing the representative bridge network thereof.

FIG. 4 is identical with the block diagram of FIG. 3 except it also delineates resistor pairs 18 and 19 and 20 and 21 included in the circuit with the one-way amplifiers 16 and 17 positioned in one-way paths 14 and 15, respectively. It will be understood that identical resistor pairs are included in each of the one-way paths connected to each of the remote subscribers. The resistor pairs positioned in each of the one-way paths connected to each subscriber as shown in FIG. 4 serve to represent the conference bridge 9 shown in FIG. 3 and well known in the art.

Referring now to FIG. 4, it will be apparent that noise originating on any one of the one-way paths will also be effective at common terminals 22 and 23 and thereby communicable to the other path connected to the bridge, and further that the noise effective at the latter terminals could impair the intelligibility of the speech transmission taking place in any one or all of the remaining one-way paths. As a consequence, it is possible that the noise may adversely affect not only the faulty one-way path per se, but also the remaining one-way paths, insofar as speech transmission is concerned. The noise may be either a white type, which has a substantially constant amplitude, or an impulse type which has a varying amplitude, both lasting for at least a predetermined time interval mentioned below, and lying in the same frequency range as the speech, that is, at least in the range of 200 through 3500 cycles per second. It is therefore imperative for the continuous maintenance of intelligible speech transmission in the system of FIGS. 3 and 4 to know at once when a circuit manifests such noise level as tends to mask speech so that an alternate route of a tolerable noise level may be substituted therefor in the system.

Figure 1:
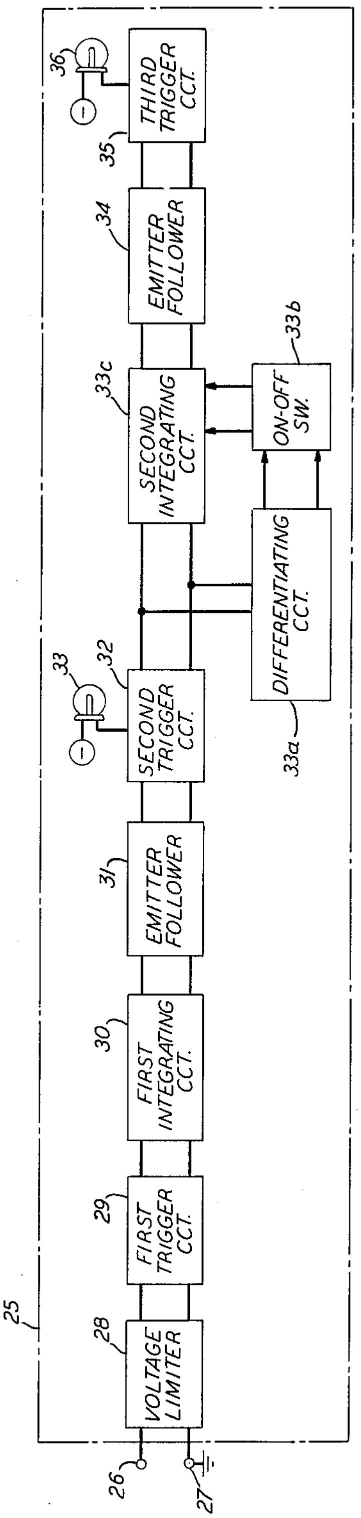
FIG. 1 is a block diagram of a specific embodiment of the invention.
Figure 5A:
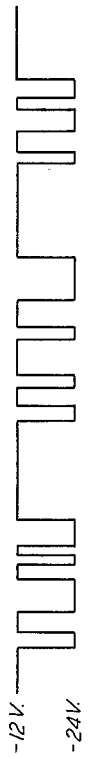
FIGS. 5A and 5B are waveforms indicating speech and noise voltages at a particular point in FIG. 5.
Figure 5B:
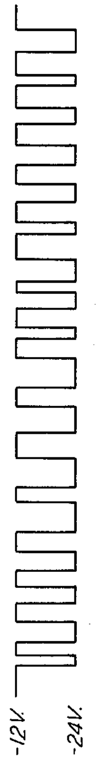
Figure 2A:
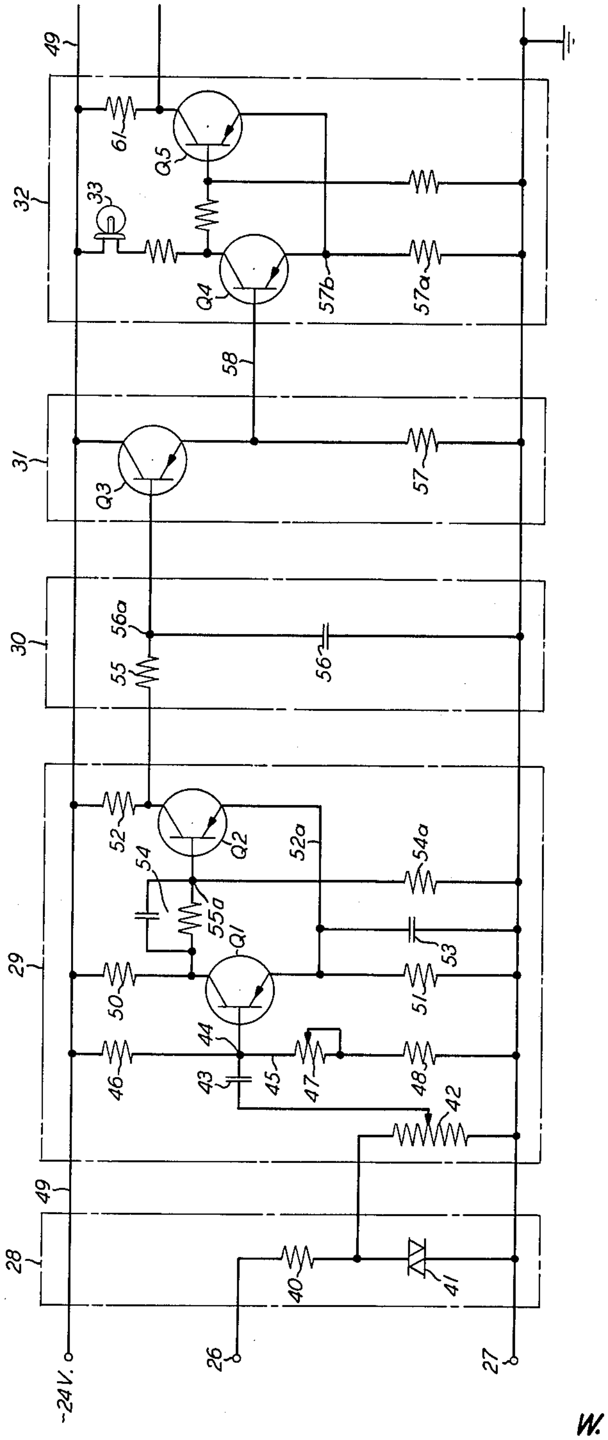
FIGS. 2A and 2B are schematic diagrams of the invention shown in FIG. 1.
Figure 2B:
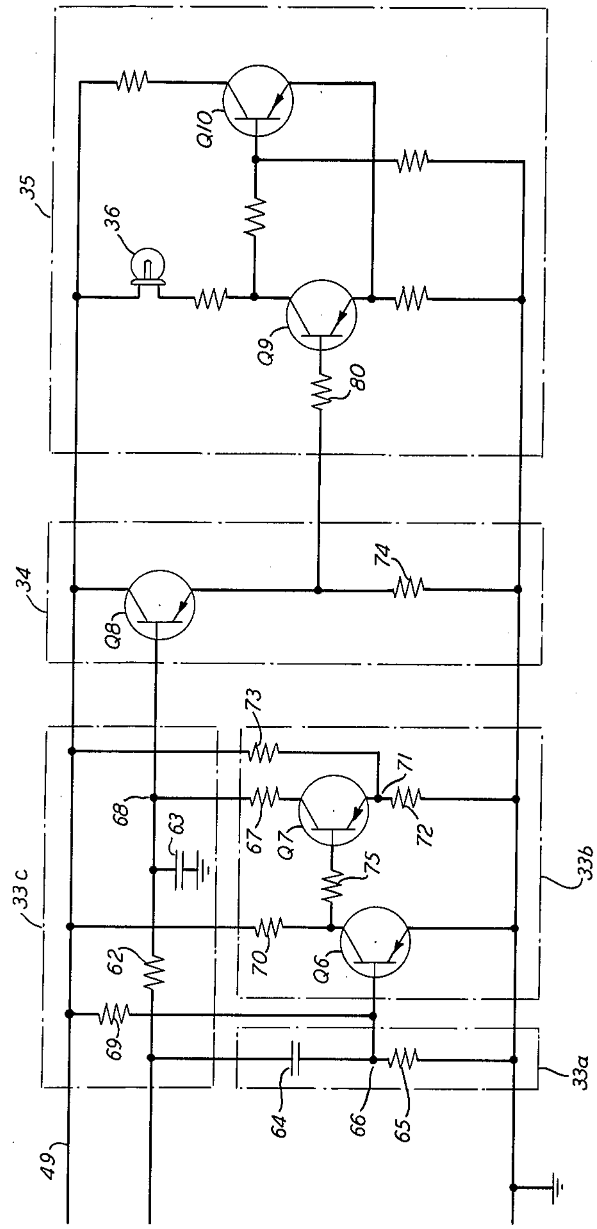
Figures 6A, 6B, 6C, 6D:
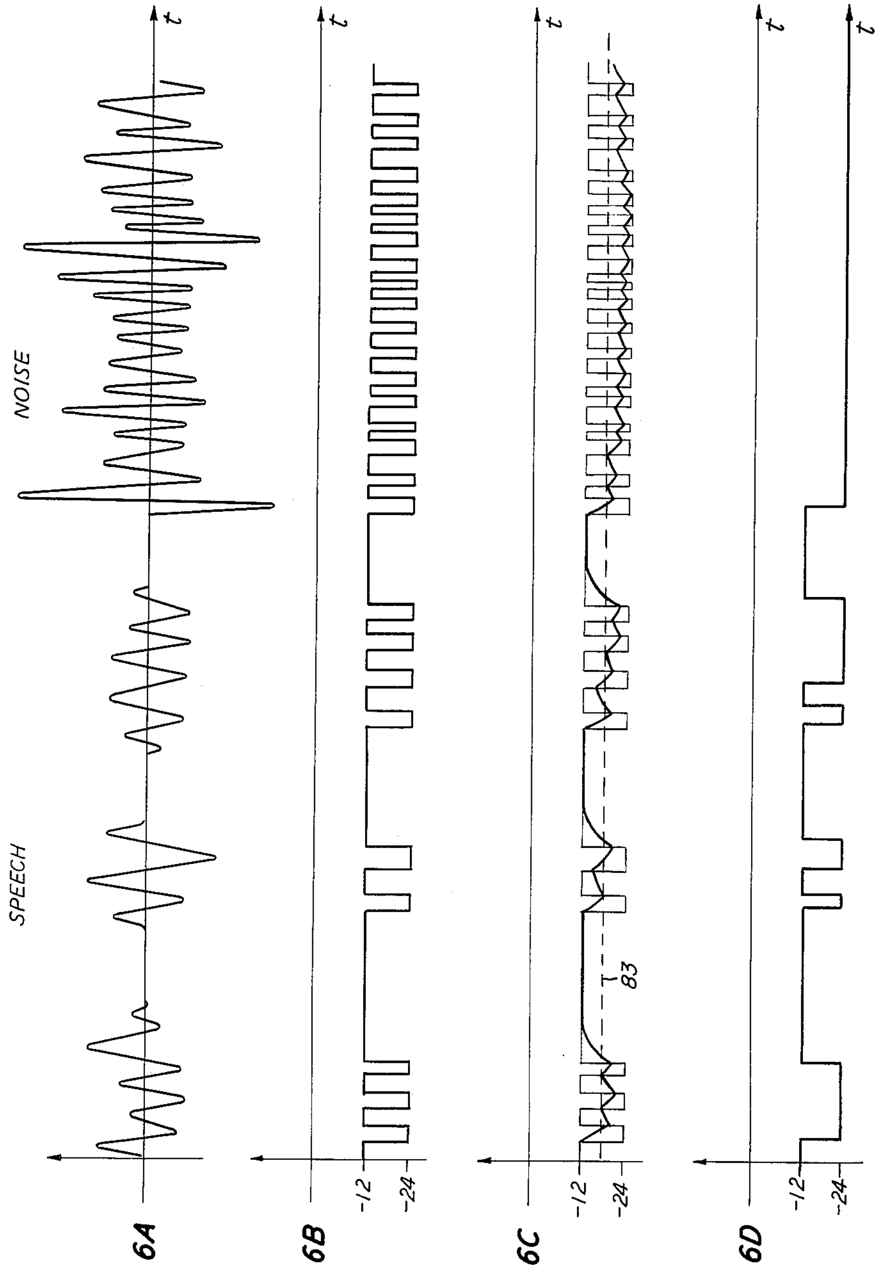
FIGS. 6A–6I is a family of waveforms illustrating voltages obtainable in FIGS. 1 and 2.

In accordance with the present invention, a noise detector 25 shown in FIGS. 1 and 2A and 2B is connected across the incoming circuit of each subscriber in proximity of conference bridge 9 in the system illustrated in FIGS. 3 and 4. It will be assumed that a composite signal voltage comprising a speech voltage component and a noise voltage component of the above-noted type is applied to input terminals 26 and 27 in FIGS. 1 and 2 of any one noise detector. This voltage is applied through voltage limiter 28 to a first trigger circuit 29 which is provided with a predetermined threshold voltage and whose output comprises successive groups of negative pulses representing the speech voltage and/or a series of negative pulses representing the noise, as illustrated in FIGS. 5A and B. This output is applied via integrator 30 and emitter follower 31 to a second trigger circuit 32 which is identical with trigger circuit 29 and is also provided with a threshold voltage. The output of the second trigger circuit comprises successive groups of negative pulses representing the speech voltage and a constant voltage magnitude representing the noise, as illustrated in FIG. 6D. Referring to FIG. 5A, it will be seen that the speech voltage includes time intervals, each of which is relatively large compared with that of the respective pulses in each group, intervening between successive pulse groups. These time intervals correspond to the time intervals between successive syllables or words. Referring to FIG. 5B, it will be seen that the noise voltage comprises a series of successive pulses but does not include a time interval corresponding with any of the time intervals intervening between the syllables or words of the speech as above mentioned. The output of the second trigger circuit may include a lamp 33 which would be intermittently energized to indicate by a flashing light the presence of the speech voltage shown in FIG. 6D and would be continuously energized to indicate by a steady light the presence of the noise voltage shown in FIG. 6D, as further explained hereinafter.

It may happen in certain instances that a very rapid talker would provide a steady light to indicate the presence of noise while only speech is present. In such event, however, the talker would come to a pause eventually whereupon the aforenoted time interval would occur between syllables and/or words to provide the flashing lamp as previously mentioned. It may then be desirable to insert a time delay of say, for example, of the order of 5 seconds to preclude the operation of the lamp in the steady manner for that period of time. This would mean that even the very rapid talker would have to pause between syllables or words after 5 seconds whereupon the steady lamp indication would become effective rather than the flashing one. This would be further discussed hereinafter in connection with FIGS. 2A and 2B.

In order to obtain only the steady lamp indication of the noisy circuit included in the system of FIGS. 3 and 4, while at the same time suppressing the speech voltage, the lamp 33 is disconnected from the second trigger circuit. Now, the output of the second trigger circuit 32 in FIG. 1 is applied to two parallel paths, viz., (1) second integrator circuit 33c and (2) differentiator circuit 33a and ON-OFF switch 33b in series. The switch 33b is connected to integrating circuit 33c. The output of integrator circuit 33c is connected via emitter follower 34 to a third trigger circuit 35 which is identical with trigger circuits 29 and 32 and which includes in its output a lamp 36 of a type identical with that of lamp 33. The third trigger circuit is also provided with the threshold voltage. The integrator circuit 33c, differentiator circuit 33a, and ON-OFF switch 33b function to render the speech voltage ineffective to energize lamp 36, while at the same time unaffecting the noise voltage for the same purpose. Now, the same (—)24-volt noise signal effective at the output of the second integrator circuit and capable of energizing lamp 33 if it were connected in the system shown in FIG. 1, will steadily exceed the threshold voltage of the third trigger circuit and thereby steadily energize lamp 36 to indicate the intolerable noise voltage by a steady light, in the presence of speech voltage. The energized lamp 36 at one or more noise detectors in FIGS. 3 and 4 will inform an attendant at the conference bridge of the existence of the corresponding noisy circuit or circuits so that an alernate incoming circuit or circuits may be substituted therefor in the system shown in FIGS. 3 and 4. Instead of an attendant, it is apparent that a circuit activated by the voltage energizing the lamp could be used to effect an automatic substitution of the alternate route. On the other hand, the magnitude of the speech voltage effective at the output of the second integrator circuit will be maintained by the differentiator circuit and ON-OFF switch, in response to the speech voltage at the output of the second trigger circuit, to a magnitude less than the threshold voltage of the third trigger circuit. As a consequence, the speech voltage effective at the output of the second integrator circuit will be unable to energize lamp 36 at any time. This obviates the speech indications at lamp 36.

The following table lists the possible signal inputs to and signal outputs from the noise detection circuit shown and described above regarding FIG. 1, and shown in FIGS. 2A and B explained hereinafter:

*Table*

| Input to Terminals 26, 27 | Lamp 33 Only | Lamp 36 Only |
|---|---|---|
| 1. None | Off | Off. |
| 2. Speech | Flashing | Off. |
| 3. Tolerable Noise | Off | Off. |
| 4. Intolerable Noise | On | On. |
| 5. Speech and Tolerable Noise | Flashing | Off. |
| 6. Speech and Intolerable Noise | On | On. |

In the foregoing table, it will be apparent for six different inputs that noise inputs 4 and 6 provide indications in either lamp 33 or lamp 36. A further description of the detailed circuitry constituting the noise detector shown in FIG. 1 will now be given in connection with FIG. 2.

In FIGS. 1, 2A and 2B, the same reference numerals are utilized to identify corresponding elements. Referring to FIG. 2A, the composite signal comprising either speech or noise voltage or both, as shown in FIG. 6A is applied to noise detector input terminals 26 and 27, the latter being ground, across which are serially connected resistor 40 and the well-known voltage limiter 28 of FIG. 1 comprising two oppositely directed diodes. This limiter serves to maintain the input signal at a substantially constant magnitude within a variation of $\pm 0.3$ volt. A potentiometer 42 connected in shunt of the limiter has its slider arm connected through capacitor 43 to point 44 included in a voltage divider 45 comprising fixed resistor 46, adjustable resistor 47 and fixed resistor 48 connected in series across a (—) 24-volt bus bar 49 and ground 27. Transistors Q1 and Q2 and associated circuitry described below constitute the first trigger circuit 29. In this trigger circuit, transistor Q1 has its base connected to point 44 of the afore-identified voltage divider, its collector via resistor 50 to the (—) 24-volt bus bar and its emitter through resistor 51 to ground; and transistor Q2 has its collector connected via resistor 52 to the (—) 24-volt bus bar and its emitter via lead 52a to the emitter of transistor Q1. Capacitor 53 bypasses reistor 51 at high signal frequencies. A parallel RC network 54 connects the collector of transistor Q1 to the base of transistor Q2. Resistor 54a connects a point 55 common to network 54 and base of transistor Q2 to ground. The foregoing circuitry describes the well-known Schmitt trigger circuit described on pages 208–210 and illustrated in FIG. 205 of "Basic Theory and Application of Transistors," TM 11–690, Department of the Army Technical Manual, March 1959. Variable resistor 47 serves to vary the bias on the base of transistor Q1 and thereby its threshold or operating point while potentiometer 42 serves to adjust the incoming composite speech and noise signal to a predetermined level suitable for the purpose of the instant explanation. This provides the first trigger with a preselected sensitivity of operation.

The first trigger circuit operates to produce in its output at the collector of transistor Q2 groups of speech square waves having large time intervals between successive pulse groups to correspond with time intervals between the syllables or words as shown in FIGS. 5A and 6B, and a series of noise square waves which are not grouped to represent syllables or words and therefore have no large time intervals to represent such syllables or words, as illustrated in FIGS. 5B and 6B, in a manner that will be presently described. It will be understood for the purpose of this description that no relation exists between the difference in the pulse widths of the aforenoted speech and noise square waves for the reason that the signal input at terminals 26 and 27 in FIG. 2A is assumed to be random with respect to amplitude, frequency, and phase.

The operation of the Schmitt trigger circuit is well known as described in the Department of the Army Technical Manual, supra, and will now be briefly explained here for the purpose of the instant invention. In the quiescent or no input signal state, transistor Q1 is cut off while transistor Q2 is conducting in its saturation region. This is due to the fact that the collector voltage of transistor Q1 is approximately 24-volts which is coupled via network 54 to the base of transistor Q2; and the base voltage of transistor Q2 is supplied with a negative voltage equivalent to that at point 55a of voltage divider comprising resistor 50, the resistor of network 54, and resistor 54a. Current flows from the emitter of transistor Q2 through common emitter resistor 51 to ground thereby holding the emitter of transistor Q1 at a certain negative voltage say, for example, (—) 12-volts. As the base of transistor Q1 is also provided with a negative bias of approximately (—) 11. volts via the afore-described voltage divider connected thereto, transistor Q1 is maintained at cutoff by the reverse bias developed between the emitter and base thereof. The (—) 14-volts effective at the base of transistor Q2 via point 55a of the voltage divider comprising resistors 50, 54 and 54a produces forward bias for the base-emitter junction and causes it to operate in the saturation region.

Now, a negative portion of the limited composite signal, that is, speech and noise voltage or either one, applied to the base of transistor Q1 and having a magnitude exceeding the reverse bias voltage of transistor Q1 overcomes the above noted reverse bias thereby causing transistor Q1 to conduct. The potential at the collector of transistor Q1 decreases, that is, becomes less negative; and this collector voltage is coupled via network 54 to the base of transistor Q2 which decreases its emitter current thereby decreasing the voltage drop across common-emitter resistor 51. The emitter voltage of transistor Q1 becomes less negative to reduce the reverse bias and increase its collector current. This action continues until transistor Q1 is conducting in its saturation region and transistor Q2 is cut off. The collector voltage of transistor Q2 then attains the predetermined (—) 24-volt maximum value.

This condition continues until the signal at input terminals 26 and 27 begins to rise or become more positive whereupon the base potential of transistor Q1 decreases and the reverse bias increases. This causes the collector voltage of transistor Q1 to increase or become more negative, the emitter current to decrease, and the voltage drop across common-emitter resistor 51 to decrease. At the same time, the increasing collector voltage of transistor Q1 is coupled via network 54 to the base of transistor Q2 thereby making it negative, while the decreasing voltage drop across resistor 51 causes the emitter voltage of transistor Q2 to go more positive. This reduces the reverse bias of the emitter-base junction of transistor Q2 which is thereupon caused to conduct in its saturation region while transistor Q1 is cut off. Now, the trigger circuit is returned to its initial quiescent condition at which the collector output of transistor Q2 is reduced to the predetermined (—) 12-volts as abovenoted in connection with the waveforms shown in FIGS. 5A and B and 6B.

The signal comprising the speech and noise square waves shown in FIGS. 5A and B and 6B are integrated in the first integrating circuit 30 comprising a resistor 55 having one terminal connected to the collector of transistor Q2 of the first trigger circuit and the base of transistor Q3 constituting emitter-follower 31, and a capacitor 56 having one terminal connected to a point 56*a* common to resistor 55, capacitor 56 and base of transistor Q3. Thus, the square wave signals received from the output of the first trigger circuit are integrated in the first integrating network to provide the speech and noise waveforms shown in 6C. These integrated waves are supplied via the emitter-follower 31 to the base of transistor Q4 which, together with transistor Q5 and associated circuitry, constitutes the second trigger circuit 32. Emitter-follower 31 has its collector connected directly to the (—) 24-volt bus bar and its emitter via resistor 57 to ground. Lead 58 connects the emitter of transistor Q3 to the base of transistor Q4. This emitter-follower transistor Q3 constitutes a well-known type of impedance transformer having high input impedance and low output impedance.

The second trigger circuit comprises circuitry which is the same as that utilized for the first trigger circuit, and it operates substantially in the manner of the first trigger circuit as hereinbefore described. It will be understood that the second trigger circuit is provided with a threshold voltage 83, as above mentioned, shown in FIG. 6C via resistor 57*a* at point 57*b*, in the well-known manner. Point 57*b* is at approximately (—) 12-volts. With no input at input terminals 26 and 27, the collector of transistor Q2 is at (—) 12-volts which is coupled via resistor 55 and base-emitter junction of transistor Q3 to the base of transistor Q4 on lead 58. This (—) 12-volts is decreased slightly to (—) 11.8 volts at the base of transistor Q4. Therefore only a voltage exceeding (—) 12-volts at the base of transistor Q4 activates the second trigger circuit to transfer conduction from transistor Q5 to transistor Q4 in the manner previously described in regard to the first trigger circuit. The collector output of transistor Q5 consists of square-wave pulses, each varying in magnitude between (—) 12 and (—) 24-volts for representing speech, and a constant voltage of (—) 24-volts for representing noise as illustrated in FIG. 6D. A lamp 33 connected in the collector circuit of transistor Q4 in FIG. 2, if desired, will indicate the presence of speech voltage by an intermittent flashing light and the presence of noise voltage by a steady light, as previously stated.

When a steady indication of the noise only is desired, the lamp 33 is removed from the circuit so that only the steady lamp indication is achieved in a manner that will now be described in regard to FIG. 2B. For this purpose it will be understood that lamp 33 is now disconnected from the circuits of FIGS. 1 and 2A. As shown in FIG. 2B, the collector of transistor Q5 is connected to a parallel path including (1) the integrator circuit 33*c* comprising resistor 62 and capacitor 63 and (2) the differentiator network 33*a* including capacitor 64 and resistor 65 and the ON-OFF switch 33*b* comprising transistor Q6 whose base is connected to a point 66 common to the differentiating capacitor 64 and resistor 65, and transistor Q7 whose base is connected via resistor 75 to the collector of transistor Q6 and whose collector is connected via resistor 67 to a junction point 68 of the integrating resistor 62 and capacitor 63. Transistor Q6 has its base and collector connected through resistors 69 and 70, respectively, to the (—) 24-volt bus bar, and its emitter directly to ground. Transistor Q7 has its emitter connected to midpoint 71 of a voltage divider including resistors 72 and 73 bridging the (—) 24-volt bus bar and ground. The junction point 68 of the integrating resistor 62 and capacitor 63 is connected to the base of emitter-follower 34 which comprises transistor Q8 having its collector directly connected to the (—) 24-volt bus bar and its emitter via resistor 74 to ground. This emitter-follower, like emitter-follower 31 including transistor Q3, is essentially an impedance transformer having high input impedance and low output impedance.

In the operation of the circuit portion including the integrator circuit 33*c*, differentiator circuit 33*a*, ON-OFF switch 33*b*, and ON-OFF switch 33*b* including transistors Q6 and Q7, it will be recalled that the collector circuit of transistor Q5 includes the speech and noise signal varying between (—) 12- and (—) 24-volts as illustrated in FIG. 6D and hereinbefore explained. When this signal is at (—) 12-volts, transistor Q6 is in the ON or conducting state, while transistor Q7 is in the OFF or nonconducting state. This is so because the base of transistor Q6 is negatively biased via voltage divider comprising resistors 65 and 69. The conduction of transistor Q6 serves to render via resistor 75 the base of transistor Q7 more positive than its associated emitter; and hence the reverse bias now provided between the base and emitter holds this transistor at cutoff. Considering now only the continuous (—) 24-volt noise portion of the signal shown in FIG. 6D and present at the collector of transistor Q5, this would charge capacitor 63 through resistor 62. As long as this noise signal remained at (—) 24-volts, the voltage charge on capacitor 63 would be decreasing in the direction of (—) 24-volts. This charge alone would then serve to exceed the threshold voltage of the third trigger circuit 35 and thereby energize lamp 36 with a steady voltage in a manner that will now be explained. This will provide a steady light from lamp 36 to indicate only the presence of noise.

Referring now to FIG. 2B, it is seen that the emitter of transistor Q8 is connected via resistor 80 to the base of transistor Q9 which together with transistor Q10 and associated circuitry forms the third trigger circuit. This circuit is identical with that of the first trigger circuit 29 hereinbefore described. The collector circuit of transistor Q9 includes the lamp 36 which is identical in type with the lamp 33 connectable in the collector circuit of the second trigger circuit. It will be understood that in a manner identical with that previously explained regarding the first trigger circuit, the quiescent condition of the third trigger circuit finds transistor Q9 at cutoff and transistor Q10 conducting in the saturation region whereby lamp 36 is extinguished. As capacitor 63 is charged to approximately (—) 24-volts by the noise voltage shown at point 82 in FIG. 6H, this voltage applied through emitter-follower 34 and resistor 80 drives Q9 into conduction and cuts off transistor Q10 as hereinbefore explained regarding the first trigger circuit. During the conduction of transistor Q9, lamp 36 in its collector circuit is energized only by the (—) 12-volt noise signal shown in FIG. 6I, while the speech portion of the voltage shown in FIG. 6H is suppressed in a manner that will now be explained.

Figures 6E, 6F, 6G, 6H, 6I:
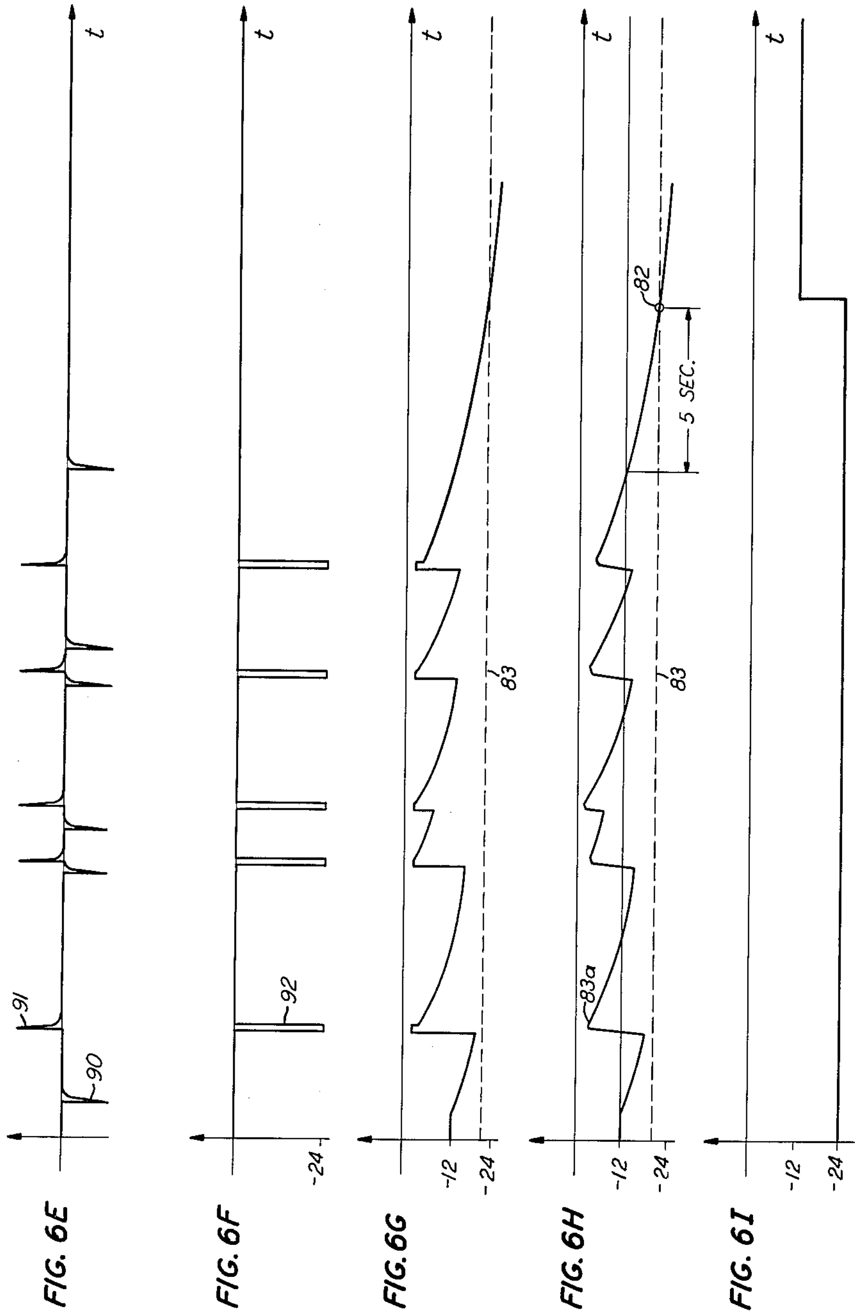

Referring to FIG. 6H, it will be understood that dash-line 83 represents the threshold voltage of the third trigger circuit whereat transistor Q9 is changed from cutoff to conduction, and vice versa, by a small amount of input voltage applied to the base thereof. This threshold is easily fixed by an appropriate selection of the circuit parameters in the well-known manner. In this respect, it will be obvious that so long as such input voltage is less than the threshold voltage transistor Q9 will remain at cutoff. The portion of the speech voltage included at the collector of transistor Q5 and illustrated in FIG. 6D is so controlled as to be held less than the threshold voltage of the third trigger circuit thereby failing to energize lamp 36 at any time, in the following manner.

When the collector voltage of transistor Q5 is going from (—) 12-volts to (—) 24-volts due to the presence of speech in the incoming signal, a negative spike 90 is produced at point 66 of differentiating circuit 33*a* as illustrated in FIG. 6E. This negative voltage applied to the base of transistor Q6 is immediately shunted to ground, due to the fact that the transistor is normally conducting, thereby exerting no effect on the conducting condition of the transistor. When the speech voltage at the collector of transistor Q5 is going from (—) 24-volts to (—) 12-volts, a positive spike 91 is produced at differentiating point 66 as shown in FIG. 6E. This positive voltage spike inverted in polarity at the collector of transistor Q6 as delineated via wave 92 in FIG. 6F, and applied to the base of transistor Q7 drives the latter to cutoff for a period of time corresponding to the time duration of the square-wave 92 in FIG. 6F. The cutoff of transistor Q6 supplies sufficient negative voltage via resistors 70 and 75 to the base of transistor Q7 thereby driving the latter into conduction. Now the conducting transistor Q7 serves to discharge capacitor 63 in a circuit including point 68, resistor 67, conducting transistor Q7, and resistor 72 to ground as illustrated in FIG. 6H, with a time constant equal to that of capacitor 63 and the sum of resistors 67 and 72. FIG. 6G shows the voltage effective at the collector of transistor Q7 during the charge and discharge of capacitor 63.

It is thus apparent in FIG. 6G that the successive discharges of capacitor 63 through successive intervals of conduction in transistor Q7 in response to speech pulses serves to hold the charge on capacitor 63 below the threshold voltage 83 of the third trigger circuit. As a consequence, the voltage charge placed on capacitor 63 by the speech portion of the input signal at input terminals 26 and 27 in FIGS. 1, 2A and 2B will be unable at any time to exceed the threshold of the third trigger circuit whereupon such speech will be unable to energize lamp 36. Thus, the speech voltage in the presence of noise is suppressed in the noise detection circuit, insofar as the flashing of lamp 36 is concerned. It will be further apparent that the portion of the charge on capacitor 63 below (—) 12-volts at point 83*a* in FIG. 6H is due to the voltage of reversed polarity on the capacitor at the moment when it commences to discharge. The time constant of the integrating resistor 62 and capacitor 63 is predetermined with a value say, for example, of the order of 5 seconds to ensure that the voltage charge placed on capacitor 63 and due solely to the speech component of the signal voltage input at terminals 26 and 27 in FIGS. 1, 2A and 2B never attains a value equal to the threshold voltage of the third trigger circuit, as illustrated in FIG. 6H. This is so as to ensure that the third trigger circuit is never activated to illuminate lamp 36 in response to the speech portion of the input signal. The threshold voltage on the third trigger circuit is obtained in the same way as that provided for the second trigger circuit, except the signal undergoes a further voltage drop across resistor 80.

In the foregoing illustration, the voltage polarities are associated with PNP transistors; and in this connection it will be understood that the voltage polarities will be reversed when NPN transistors are used.

It is to be further understood that the above-described embodiment is merely illustrative of the application of the invention. Numerous other embodiments may occur to those skilled in the art without departing from the spirit and scope of the invention.

What is claimed is:

1. In a speech transmission system including a bridge network interconnecting a plurality of discrete speech transmission circuits, each of which transmits speech and noise voltages communicable to the other circuits at said bridge network in such manner that the noise voltage tends to render the speech voltage unintelligible, the method of identifying the respective circuits transmitting such noise voltage, which consists of translating the speech voltage on each of said circuits into a plurality of square-wave voltages having a predetermined magnitude, translating the noise voltage on each of said circuits into a constant voltage having a magnitude equal to the square-wave predetermined magnitude, providing for each of said circuits an indication of the constant noise voltage for identifying the respective noisy circuits, and suppressing the speech square-wave voltage of each of said circuits to a magnitude less than the predetermined magnitude of the constant noise voltage for obviating indications of the speech voltage on the respective circuits.

2. In a speech transmission system including a bridge network interconnecting a plurality of speech transmission circuits, each of which transmits speech and noise voltages communicable to the other circuits at said bridge network in such manner that the noise voltage tends to render the speech voltage unintelligible, the method of identifying the respective circuits transmitting such speech and noise voltages, which consists of translating the speech voltage of each of said circuits into a plurality of groups of voltage pulses having a predetermined magnitude to represent speech syllables and having relatively long time intervals between adjacent pulse groups to represent time intervals between adjacent syllables, translating the noise voltage on each circuit into a constant voltage having a magnitude equal to the predetermined magnitude of the speech pulse groups, and providing an intermittent indication of the speech groups of voltage pulses on each of said circuits and a continuous indication of the noise constant voltage on each of said circuits to identify the individual circuits transmitting the speech and noise voltages, respectively.

3. In a speech transmission system including a plurality of discrete speech transmission circuits, a bridge network to interconnect said circuits for enabling speech communication therebetween, each circuit transmitting speech and noise voltage tending to render the speech voltage unintelligible, both of which voltages are communicable to the other circuits at said bridge, and a plurality of devices for identifying the respective circuits transmitting such speech and noise voltage, each of said devices comprising terminals to connect each device to one of said circuits, means to translate the speech voltage into a plurality of groups of pulses having a predetermined magnitude for representing the syllables of the speech voltage and having relatively long time intervals between adjacent pulse groups to represent the time intervals between adjacent syllables, said means also translating the noise voltage into a constant voltage having a predetermined magnitude substantially equal to the predetermined pulse magnitude, and means connected to said translating means and responsive to the speech pulse groups to indicate in an intermittent manner the speech voltage on said one circuit and further responsive to the constant noise voltage to indicate in a continuous manner the noise voltage on said one circuit.

4. The system according to claim 3 in which said translating means includes a first trigger circuit having an input connected to said terminals and an output coupled to said indicating means.

5. The system according to claim 4 in which said translating means includes an integrator circuit comprising a resistor and a capacitor, said resistor connected to the output of said first trigger circuit, and a point common to said resistor and capacitor coupled to said indicating means.

6. The system according to claim 5 in which said translating means includes an emitter-follower impedance transformer comprising a transistor including a base electrode and an emitter electrode, said base electrode connected to said point common to said resistor and capacitor of said integrating circuit and said emitter electrode coupled to said indicating means.

7. The system according to claim 6 in which said translating means includes a second trigger circuit having an input connected to said emitter electrode and an output connected to said indicating means.

8. The system according to claim 3 in which said translating means comprises a first trigger circuit having an input connected to said terminals and also having an output, an integrating circuit having an input connected to said first trigger circuit output and also having an output, an emitter-follower comprising an emitter electrode and base electrode connected to said integrating circuit output, and a second trigger circuit having an input connected to said emitter electrode and also having an output, and said indicating means is connected to said second trigger circuit output.

9. In a speech transmission system including a plurality of discrete speech transmission circuits, a bridge network to interconnect said circuits for enabling speech communication therebetween, each circuit transmitting speech and noise voltages in such manner that the noise voltage tends to mask the speech voltage at the bridge network, and a plurality of devices, each connected to one of said circuits for identifying the respective circuits transmitting such noise voltage, each of said devices comprising means including a capacitor to translate the noise voltage into another voltage having a predetermined magnitude represented by one voltage charge on said capacitor and the speech voltage into a further voltage having a magnitude less than the predetermined magnitude of said other voltage and represented by a different voltage charge on said capacitor, and means connected to said capacitor and translating means and provided with a threshold voltage of a magnitude substantially equal to the predetermined magnitude of said other voltage so that said other voltage represented by said one capacitor charge exceeds the threshold voltage to provide an indication of the noise voltage on each of said circuits and so that said further voltage represented by said different capacitor charge fails to exceed the threshold voltage to preclude an indication of the speech voltage on each of said circuits.

10. In a speech transmission system including a plurality of discrete speech transmission circuits, a bridge network to interconnect said circuits for enabling speech communication therebetween, each circuit transmitting a noise voltage tending to mask the speech voltage both of which voltages are communicable to the other circuits connected to said bridge, and a plurality of devices, each connected to one of said circuits for identifying said one circuit as transmitting such noise voltage, each of said devices comprising means to translate said speech voltage received from said one circuit into a plurality of groups of square-wave voltages having a predetermined magnitude and representing speech syllables and also having relatively large time intervals between adjacent groups of square-wave voltages for representing the time intervals between syllables, said means also translating said noise voltage received from said one circuit into a constant voltage having a magnitude equal to the predetermined magnitude of the speech square-wave voltage, means connected to said translating means for changing the constant noise voltage into another voltage having the last-mentioned predetermined magnitude, means connected to said changing means and provided with a threshold voltage of a magnitude substantially equal to the predetermined magnitude of said other voltage so that said last-mentioned other voltage exceeds the threshold voltage to indicate such noise is present in said one circuit, said changing means also changing the speech square-wave voltage groups into a further voltage tending to have a magnitude equal to the predetermined magnitude of said other voltage for exceeding the threshold voltage, and means connected between said translating means and changing means and responsive to the speech square-wave voltage groups for maintaining said further voltage at a magnitude below the threshold voltage of said indicating means so that said last-mentioned further voltage fails to exceed the threshold voltage thereby precluding an indication of the speech voltage present in said one circuit.

11. The system according to claim 10 in which said translating means includes a first trigger circuit having an input coupled to said one circuit and an output coupled to said changing means.

12. The system according to claim 11 in which said translating means includes a first integrator circuit having an input connected to said first trigger circuit output and having an output coupled to said changing means.

13. The system according to claim 12 in which said translating means includes a second trigger circuit having an input connected to said integrator output and an output connected to said changing means.

14. The system according to claim 13 in which said changing means comprises a second integrator circuit having an input connected to said trigger circuit output and having an output coupled to said indicating means.

15. The system according to claim 14 in which said indicating means comprises a third trigger circuit provided with the threshold voltage and having an input coupled to said integrator circuit output and having an output including an indicator to indicate when the threshold voltage is exceeded.

16. The system according to claim 15 in which said second integrator circuit comprises a network including a resistor and a capacitor in series, said maintaining means comprising a differentiator circuit having an input connected to said second trigger circuit output and having an output, an ON-OFF circuit having an input connected to said differentiator circuit output and having an output effectively connectable in shunt of said capacitor in the ON condition to discharge said capacitor and effectively disconnectable from said capacitor in the OFF condition, said differentiator circuit having no output voltage whereby said ON-OFF circuit is allowed to rest in the OFF condition in the absence of speech voltage in the output of said second trigger circuit, said differentiator circuit having a positive voltage output in response to speech voltage at the output of said second trigger circuit for activating said ON-OFF circuit to the ON condition to discharge said further voltage from said capacitor during the time interval of each of said last-mentioned positive voltages thereby maintaining said last-mentioned further voltage at a magnitude below the threshold voltage of said third trigger circuit.

17. The system according to claim 16 in which said differentiator comprises a series capacitor and resistor, said ON-OFF circuit comprises a pair of transistors, each having a base, a collector and an emitter, the base of a first of said transistors connected to a midpoint of said differentiator capacitor and resistor while the collector and emitter of said one transistor are connected to a source of activating voltage, the base of a second of said transistors connected to the collector of said first transistor while the collector of said second transistor is connected to a midpoint of said second integrator resistor and capacitor, said last-mentioned collector and emitter also connected to said activating voltage source, said second transistor being nonconducting and conducting in said OFF and ON conditions, respectively, of said ON-OFF circuit.

18. The system according to claim 17 in which said second integrator circuit is provided with such preselected time constant that the charge on said second integrator capacitor never attains the threshold voltage of said third trigger circuit when speech voltage is charging said last-mentioned capacitor.

19. In a speech transmission system including a bridge network interconnecting a plurality of discrete speech transmission circuits, each of which transmits speech and noise voltages communicable to the other circuits at said bridge network in such manner that the noise voltage tends to mask the speech voltage, the method of identifying the respective circuits transmitting such noise voltage, which consists of translating the noise voltage on each circuit into a constant voltage having a predetermined magnitude, providing an indication of such constant voltage to identify each noisy circuit, translating the speech on each circuit into a further voltage having a magnitude tending to equal the predetermined magnitude of the constant noise voltage, and suppressing the further voltage to a magnitude less than the predetermined magnitude of the constant noise voltage for precluding an indication of the further speech voltage on any of said circuits.

References Cited by the Examiner

UNITED STATES PATENTS

| | | | |
|---|---|---|---|
| 2,958,729 | 11/1960 | Licklider | 179—1 |
| 3,038,119 | 6/1962 | Billig et al. | 179—1 |
| 3,101,446 | 8/1963 | Glomb et al. | 325—2 X |

ROBERT H. ROSE, *Primary Examiner.*

WILLIAM C. COOPER, *Examiner.*